US012658052B2

(12) United States Patent
Tanaka et al.

(10) Patent No.: US 12,658,052 B2
(45) Date of Patent: Jun. 16, 2026

(54) DRIVING ASSISTANCE DEVICE

(71) Applicant: HITACHI ASTEMO, LTD.,
Hitachinaka (JP)

(72) Inventors: Yuya Tanaka, Tokyo (JP); **Satoshi
Matsuda, Tokyo (JP); Keisuke
Takeuchi,** Tokyo (JP)

(73) Assignee: Hitachi Astemo, Ltd., Ibaraki (JP)

( * ) Notice: Subject to any disclaimer, the term of this
patent is extended or adjusted under 35
U.S.C. 154(b) by 105 days.

(21) Appl. No.: 18/843,960

(22) PCT Filed: Apr. 4, 2023

(86) PCT No.: PCT/JP2023/013876
§ 371 (c)(1),
(2) Date: Sep. 4, 2024

(87) PCT Pub. No.: WO2023/223699
PCT Pub. Date: Nov. 23, 2023

(65) Prior Publication Data
US 2025/0182624 A1 Jun. 5, 2025

(30) Foreign Application Priority Data
May 16, 2022 (JP) ................................. 2022-079915

(51) Int. Cl.
*G08G 1/16* (2006.01)
*G06V 10/62* (2022.01)
(Continued)

(52) U.S. Cl.
CPC ............. *G08G 1/166* (2013.01); *G06V 10/62*
(2022.01); *G06V 10/7715* (2022.01); *G06V
20/584* (2022.01)

(58) Field of Classification Search
CPC .. G08G 1/166; G06V 20/584; G06V 10/7715;
G06V 10/62
(Continued)

(56) References Cited

U.S. PATENT DOCUMENTS 10,322,728 B1 * 6/2019 Porikli ................... G06V 10/80
2010/0004839 A1 * 1/2010 Yokoyama ....... G08G 1/096783
701/70
(Continued)

FOREIGN PATENT DOCUMENTS

JP 2021160626 A 10/2021

OTHER PUBLICATIONS

International Search Report with English Translation of Interna-
tional Patent Application No. PCT/JP2023/013876 dated Jun. 1, 20,
2023.

*Primary Examiner* — Kerri L Mcnally
(74) *Attorney, Agent, or Firm* — Volpe Koenig

(57) ABSTRACT

A traveling support system detects a drop in a driver's
performance and issues an alarm to the driver. The traveling
support system includes: a trailing operation normality
learning unit that learns a tendency of fluctuation in a trailing
operation by a driver of the host vehicle of trailing a
preceding vehicle is included in a normal range, from at least
one feature of a change in a state of the host vehicle and a
change in a state between the host vehicle and the preceding
vehicle, the feature being calculated based on given data
detected in time series; a trailing operation abnormality
determining unit that determines that the current trailing
operation is abnormal when fluctuation has a difference of a
given size or more with the normal range; and an alarm
control unit that issues an alarm when the current trailing
operation is determined to be abnormal.

15 Claims, 5 Drawing Sheets

(51) Int. Cl.
  _G06V 10/77_ (2022.01)
  _G06V 20/58_ (2022.01)

(58) Field of Classification Search
  USPC ........................................................ 340/935
  See application file for complete search history.

(56) References Cited

U.S. PATENT DOCUMENTS

| | | | |
|---|---|---|---|
| 2015/0307106 A1* | 10/2015 | Rao | B60W 50/10 |
| | | | 701/29.1 |
| 2018/0222424 A1* | 8/2018 | Kodama | B60R 21/0134 |
| 2019/0129422 A1* | 5/2019 | Nojoumian | G05D 1/0088 |
| 2022/0212542 A1* | 7/2022 | Ortmann | B60T 8/321 |
| 2023/0227037 A1* | 7/2023 | Zhao | B60W 40/105 |
| | | | 701/1 |

* cited by examiner

DRIVING ASSISTANCE DEVICE

TECHNICAL FIELD

The present invention relates to a traveling support system that prevents collision with an obstacle or reduces the risk of the collision that may occur because of carelessness of a driver of a host vehicle when the driver is in a state of a slight drop in the driver's performance in driving.

BACKGROUND ART

In a technical field related to the present invention, the invention of a driver state detection device has been known. In this device, an abnormality of a driver, which is the driver's falling into a state of a slight drop in the driver's performance in driving is detected by a front vehicle detection sensor and an acceleration/deceleration sensor that detects acceleration or deceleration (see Patent Literature 1 below).

For example, Patent Literature 1 discloses a driver state detection device that detects an abnormality of a driver, which device includes: a front vehicle detection sensor that detects a vehicle traveling ahead of a host vehicle or a vehicle traveling side by side or ahead of the vehicle; an host acceleration/deceleration sensor that detects acceleration or deceleration of the host vehicle; an acceleration/deceleration calculation unit that based on an acceleration/deceleration model, calculates proper acceleration or deceleration for causing the host vehicle to travel in such a way as to trail a preceding vehicle detected by the front vehicle detection sensor; and an abnormality determining unit that compares the acceleration or deceleration calculated by the acceleration/deceleration calculation unit with actual acceleration or deceleration of the host vehicle that is detected by the acceleration/deceleration sensor to determine the presence or absence of an abnormality of the driver. In a case where a different vehicle that may cut in between the preceding vehicle the hots vehicle is trailing and the host vehicle is detected by the front vehicle detection sensor, if a degree of matching between the acceleration or deceleration calculated by the acceleration/deceleration calculation unit and the actual acceleration or deceleration of the host vehicle is higher than a given threshold, the abnormality determining unit determines that the driver is in a state of abnormality.

CITATION LIST

Patent Literature

PTL 1: JP 2021-160626 A

SUMMARY OF INVENTION

Technical Problem

However, according to Patent Literature 1, a state of a drop in the driver's performance in driving is detected at a point of time at which a difference between the acceleration or deceleration of the driver and the proper acceleration or deceleration for trailing the preceding vehicle becomes equal to or larger than a given threshold. For this reason, the state of the drop in the driver's performance in driving is not detected until a delay in the driver's operation of trailing the preceding vehicle occurs. In a case where deceleration of the preceding vehicle is sharp, therefore, there is a possibility that even if an alarm is issued after detection of the state of the drop in the driver's performance in driving, a time the driver needs to recover normal performance in driving cannot be secured. It is possible that making the threshold smaller to allow earlier detection of the state of the drop in the driver's performance in driving. However, too earlier detection of the state of the drop in the driver's performance in driving may result in an erroneous detection of the same, in which case the driver may feel troublesome.

The present invention has been conceived in view of the above circumstances, and an object of the present invention is to provide a traveling support system that detects a sign of a driver's falling into a state of a drop in the driver's performance in driving and that can issue an alarm earlier to the driver without making the driver feel troublesome.

Solution to Problem

In order to achieve the above object, a traveling support system of the present invention is provided, which includes: a preceding vehicle recognizing unit that detects a preceding vehicle traveling ahead of a host vehicle; a trailing operation normality learning unit that learns whether a tendency of fluctuation in a trailing operation by a driver of the host vehicle of trailing the preceding vehicle is included in a normal range, from at least one feature of a change in a state of the host vehicle and a change in a state between the host vehicle and the preceding vehicle, the one feature being calculated based on given data detected in time series; a trailing operation abnormality determining unit that when fluctuation in a current trailing operation has a difference of a given size or more with the normal range, determines that the current trailing operation is abnormal; and an alarm control unit that when the current trailing operation is determined to be abnormal, gives an instruction to issue an alarm. This traveling support system detects a sign of the driver's falling into a state of a drop in the driver's performance in driving and issues a warning earlier to the driver.

Advantageous Effects of Invention

According to the present invention, by detecting a sign of a driver's falling into a state of a drop in the driver's performance in driving, an alarm is issued earlier to the driver to prevent collision with an obstacle or reduce the risk of the collision.

Problems, configurations, and effects other than those described above will be made clear by the following description of embodiments.

BRIEF DESCRIPTION OF DRAWINGS

FIG. 1 is a configuration diagram of a traveling support system according to one embodiment of the present invention.

FIG. 3 is a trailing operation abnormality determination inhibition scene 1 of the traveling support system according to the one embodiment of the present invention.

FIG. 4 is a trailing operation abnormality determination inhibition scene 2 of the traveling support system according to the one embodiment of the present invention.

DESCRIPTION OF EMBODIMENTS

Figure 2:
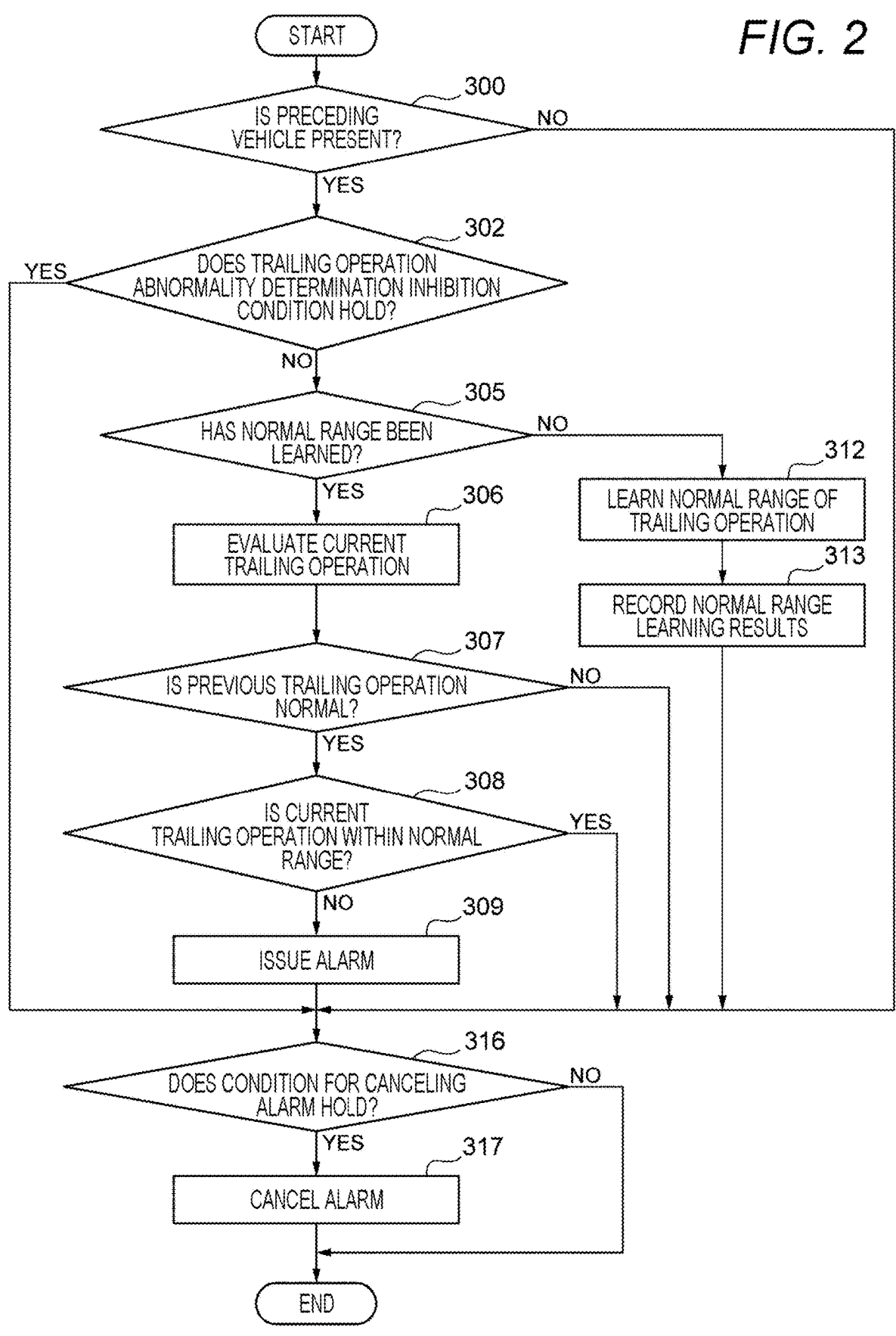
FIG. 2 is a flowchart of steps executed by the traveling support system according to the one embodiment of the present invention.

Hereinafter, embodiments of a traveling support system according to the present invention will be described with reference to the drawings.

<First Embodiment: Embodiment in Which Learning Results Are Parameters>

Figure 1:
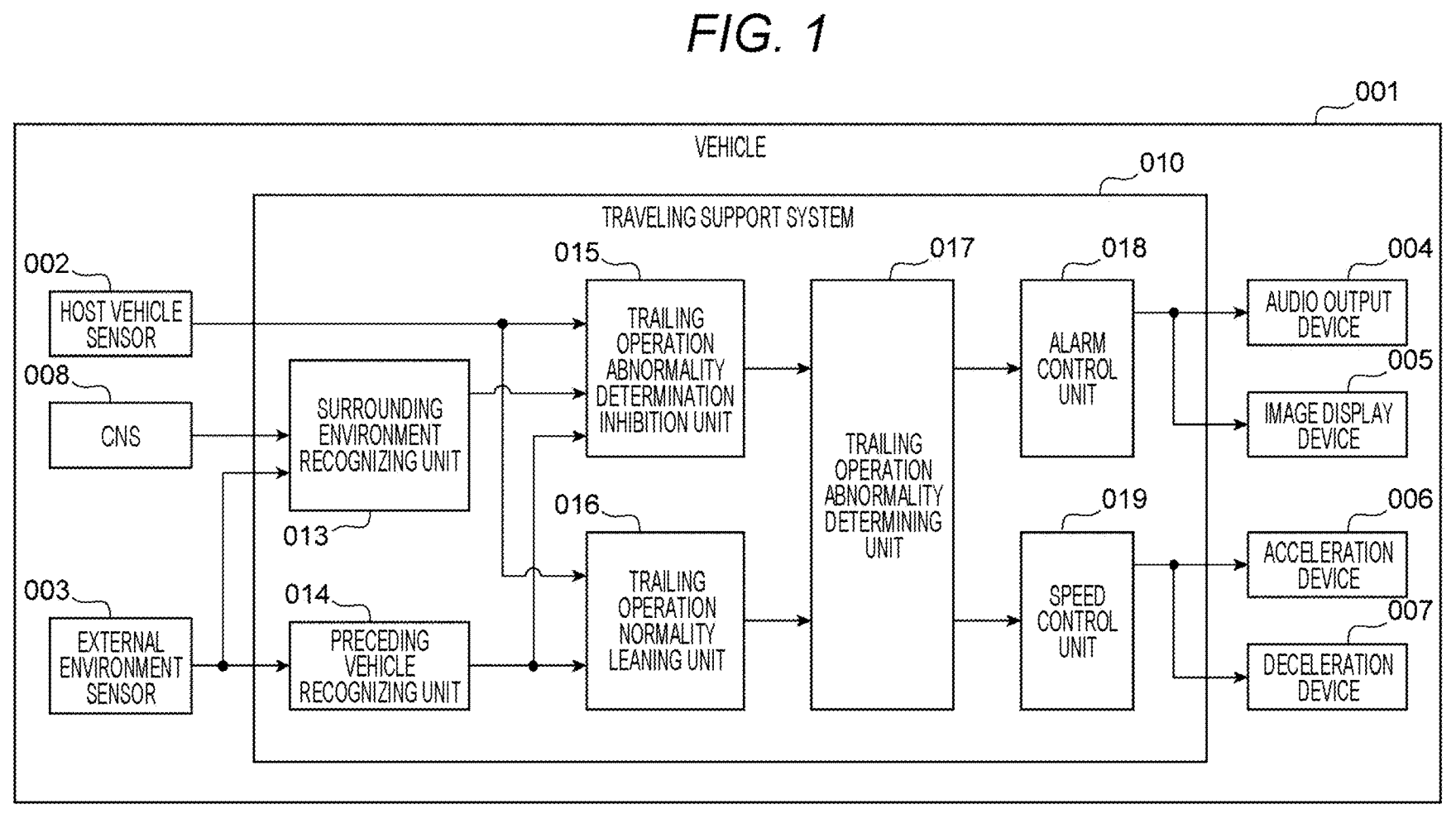

FIG. 1 is a configuration diagram of a traveling support system according to one embodiment of the present invention.

[Description of Configuration]

A traveling support system 010 of the first embodiment is an electronic control unit (ECU) incorporated in a vehicle (host vehicle) 001, such as a gasoline car, a diesel car, a natural gas car, a hybrid car, an electric car, a fuel cell car, or a hydrogen engine car. The traveling support system 010 is composed of one or more microcontrollers including, for example, an input/output unit, a central processing unit (CPU), memories (including both a nonvolatile memory and a volatile memory), and a timer, which microcontrollers are not illustrated.

(Host Vehicle 001)

The host vehicle 001 is equipped with, for example, a host vehicle sensor 002, an external environment sensor 003, a car navigation system (CNS) 008, an audio output device 004, an image display device 005, an acceleration device 006, and a deceleration device 007. The host vehicle 001 includes a drive system, a steering system, a braking system, and a control system for causing the host vehicle 001 to travel, make a turn, decelerate, and stop, which systems are not illustrated.

(Host Vehicle Sensor 002)

The host vehicle sensor 002 includes various sensors, such as a wheel speed sensor, an acceleration sensor, a shift position sensor, a gyro sensor, a steering angle sensor, and blinkers, that detect states of the host vehicle. The host vehicle sensor 002 detects states of the host vehicle, which include the speed and acceleration of the host vehicle 001, a shift position of a transmission, a yaw rate, a steering angle, a blinker operation status, and an abnormality of the host vehicle 001, and outputs the detected states to the traveling support system 010. Abnormalities of the host vehicle 001 detected by the host vehicle sensor 002 include, for example, an abnormality of a tire air pressure, of a remaining fuel volume, of an engine, of an anti-lock brake system (ABS), of an airbag, of a brake, of a hydraulic pressure, of a battery, and of a water temperature.

(External Environment Sensor 003)

The external environment sensor 003 includes, for example, a millimeter wave radar using a reflected radio wave, such as a millimeter wave, a monocular camera, a stereo camera, a LiDAR (Light Detection and Ranging, Laser Imaging Detection and Ranging) that measures scattered light from a target exposed to pulsed laser light to determine the distance to the target, an ultrasonic sensor using a reflected ultrasonic wave, a road-to-vehicle communication device, a vehicle-to-vehicle communication device, an illuminance sensor, a raindrop sensor, and a humidity sensor. The external environment sensor 003 detects, for example, objects present around the host vehicle 001, such as a road, a lane marking, a sign, a traffic signal, a vehicle, a pedestrian, and an obstacle, and surrounding environment conditions, such as illuminance, rainfall, humidity, and visibility of an obstacle, and outputs a detected object or environment condition to the traveling support system 010. In an example of FIG. 3, the millimeter wave radar, the monocular camera, the stereo camera, the LiDAR, and the like of the external environment sensor 003 detect vehicles 402 and 403 present in a detection range 401 with respect to the host vehicle 400, and output the detection result to the traveling support system 010. The detection range 401 is an example of various detection ranges.

(CNS 008)

The CNS 008 includes, for example, a map information storage device, a route calculation device, a vehicle-to-vehicle communication device, a road-to-vehicle communication device, and a global navigation satellite system (GNSS) receiver. In addition, the CNS 008 is provided with, for example, an input device on which the driver of the host vehicle 001 inputs a destination. The CNS 008 outputs, for example, the following pieces of information to the traveling support system 010: on-map point information based on position information on the host vehicle 001, route information indicating a route from the current location of the host vehicle 001 to the destination, intersection position information indicating intersections that appear on the route from the current location to the destination, curve information, such as a radius of curvature, slope information, stop sign information, lane width information, traffic signal information, and the like.

(Audio Output Device 004)

The audio output device 004 is, for example, a speaker disposed in the vehicle interior of the host vehicle 001, and outputs an alarm sound or voice guidance, based on an incoming control signal from the traveling support system 010.

(Image Display Device 005)

The image display device 005 is, for example, a liquid crystal display device, an organic EL display device, or a head-up display, and displays an image, based on an incoming control signal from the traveling support system 010. The image display device 005 may include, for example, an input device, such as a touch panel or an operation button. The driver of the host vehicle 001 can output information, such as a destination, to the CNS 008 through, for example, the input device of the image display device 005. In addition, on the input device of the image display device 005, the driver may be able to input a result of determination on whether an alarm sound or alarm message outputted to the audio output device 004 or the image display device 005 is correct. Further, on the input device of the image display device 005, the driver may be able to select a parameter to be used out of a plurality of parameters for use in processes by the traveling support system 010.

(Acceleration Device 006)

The acceleration device 006 is, for example, an engine or a motor, and accelerates the host vehicle 001, based on an incoming control signal from the traveling support system 010. In addition, the acceleration device 006 has a function of preventing acceleration of the host vehicle 001, based on an incoming acceleration inhibition request from the traveling support system 010, even when the driver steps on the accelerator.

(Deceleration Device 007)

The deceleration device 007 is, for example, a brake, and decelerates the host vehicle 001, based on an incoming control signal from the traveling support system 010.

(Traveling Support System 010)

The traveling support system 010 according to this embodiment is incorporated in the host vehicle 001, and functions as a traveling support system that detects a hint of the driver of the host vehicle 001 being in a state of a drop in the driver's performance in driving and that assists the driver in recovering normal performance in driving. The traveling support system 010 includes a surrounding environment recognizing unit 013, a preceding vehicle recognizing unit 014, a trailing operation abnormality determination inhibition unit 015, a trailing operation normality learning unit 016, a trailing operation abnormality determining unit 017, an alarm control unit 018, and a speed control unit 019.

(Surrounding Environment Recognizing Unit 013)

The surrounding environment recognizing unit 013 detects object information and road information on the surroundings of the host vehicle. For example, the object information indicates an object, such as a vehicle (a four-wheeled vehicle, a two-wheeled vehicle, a bicycle, etc.) traveling on a lane adjacent to a host vehicle lane, a pedestrian, or an obstacle. The road information, on the other hand, provides information on an intersection position, a curve including a radius of curvature, a stop sign, a lane width, a traffic signal position, and a traffic signal status.

The surrounding environment recognizing unit 013 outputs recognition results, such as the position and speed of an object nearby, acceleration and deceleration, and the position of a road nearby, to the trailing operation abnormality determination inhibition unit 015.

(Preceding Vehicle Recognizing Unit 014)

Figures 3, 4:
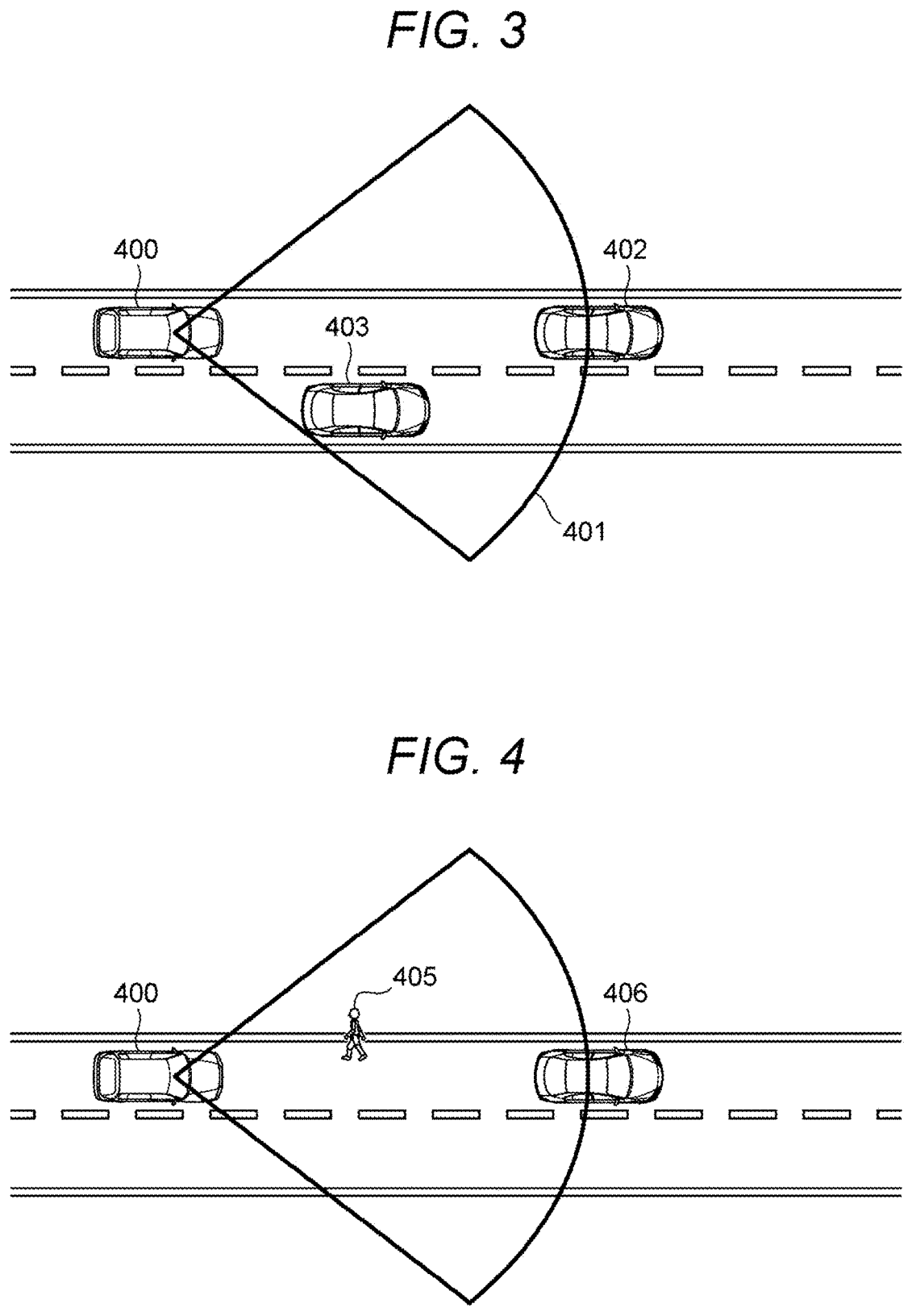

The preceding vehicle recognizing unit 014 detects a preceding vehicle traveling ahead of the host vehicle. In the example of FIG. 3, the vehicle 402 traveling ahead of the host vehicle 400 is an example of the preceding vehicle. Traveling ahead of the host vehicle 400 means traveling in an area in the direction of the host vehicle's moving forward in the lane. The preceding vehicle, which is a four-wheeled vehicle, a two-wheeled vehicle, a bicycle, or the like, refers to an object that is present within the detection range 401 in front of the host vehicle and that is separated from the host vehicle by a given distance or less distance.

The preceding vehicle recognizing unit 014 outputs recognition results, such as the position, speed, and acceleration/deceleration of the preceding vehicle, to the trailing operation abnormality determination inhibition unit 015 and the trailing operation normality learning unit 016.

(Trailing Operation Abnormality Determination Inhibition Unit 015)

The trailing operation abnormality determination inhibition unit 015 determines whether or not to inhibit a determination of abnormality made by the trailing operation abnormality determining unit 017. By this determination by the trailing operation abnormality determination inhibition unit 015, a situation in which a determination of abnormality made by the trailing operation abnormality determining unit 017 may be erroneous can be excluded from processing subjects. In other words, whether the current state is a transient state, in which whether fluctuation in the current trailing operation is normal or abnormal cannot be determined, is determined (predicted). The fluctuation in the trailing operation refers to relative movements the host vehicle and the preceding vehicle make to each other when the driver of the host vehicle performs manual driving to trail the preceding vehicle. The relative movements refer to changes in a state of the host vehicle (calculated based on given data) that is detected in time series by the host vehicle sensor 002 or changes in a state between the host vehicle and the preceding vehicle that is detected by the external environment sensor 003. Specifically, changes in the state of the host vehicle include a change in acceleration/deceleration and a change in the host vehicle speed. Changes in the state between the host vehicle and the preceding vehicle include a change in a relative speed, a change in an inter-vehicle distance, and a change in relative acceleration.

Figure 6:
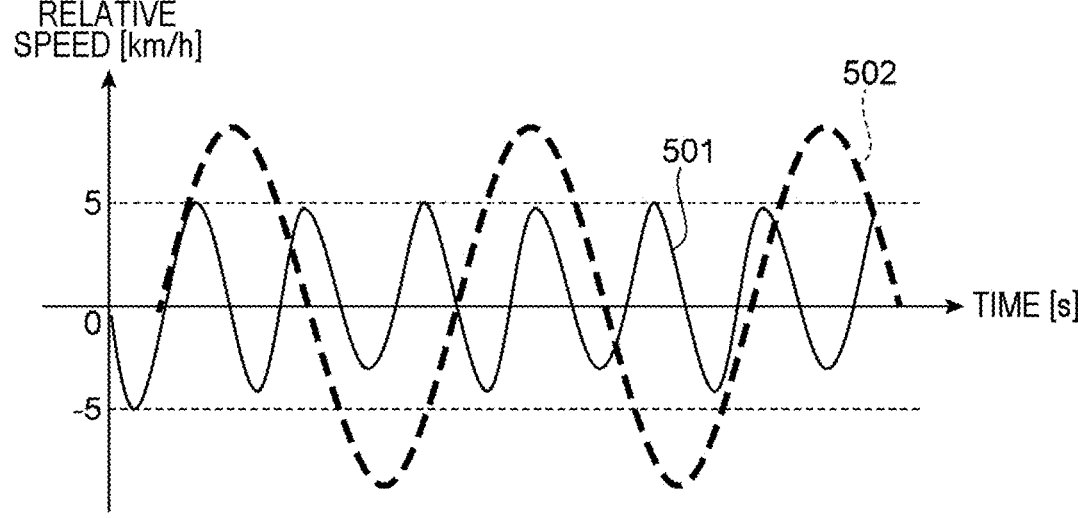
FIG. 6 is an example of a tendency of fluctuation in a trailing operation of the traveling support system according to the one embodiment of the present invention.

In general, when the driver performs manual driving to cause the host vehicle to trail the preceding vehicle, the driver carries out the trailing operation in such a way as to bring the inter-vehicle distance and relative speed to the preceding vehicle closer to target values the driver intends to achieve. It is known that during this process, fluctuation in the trailing operation develops. For example, the fluctuation in the trailing operation can be regarded as a change in the relative speed, as shown in FIG. 6. In FIG. 6, the fluctuation in the trailing operation being normal is indicated as a relative speed change 501 that goes up and down in a range of ±5 km/h with respect to 0 km/h (5 km/h is an example of a limit value). The fluctuation in the trailing operation being abnormal is indicated as the case of a relative speed change 502 that fluctuates beyond the range of ±5 km/h. In this case, the relative speed goes up and down fewer times than the relative speed in the case of the trailing operation being normal does.

A situation in which a determination of abnormality made by the trailing operation abnormality determining unit 017 may be erroneous is, for example, a situation in which the preceding vehicle accelerates or decelerates sharply. In this situation, because acceleration or deceleration of the preceding vehicle creates a difference in changes in the inter-vehicle distance or the relative speed, the driver is expected to carry out a trailing operation different from a trailing operation in a normal situation. This makes determining whether the trailing operation is normal or abnormal difficult, for which reason a determination of abnormality is inhibited. Whether the preceding vehicle has accelerated or decelerated sharply can be determined according to the fact that the deceleration of the preceding vehicle is equal to or larger than a given threshold or the acceleration of the same is equal to or larger than a given threshold, the deceleration and acceleration being obtained from the preceding vehicle recognizing unit 014.

When whether a blinker of the preceding vehicle is in operation can be determined based on information from the monocular camera or the stereo camera of the external environment sensor 003, the preceding vehicle's leaving the host vehicle lane (traveling lane) in the future may be predicted. In this case, there is a possibility that the driver intentionally accelerates or decelerates the host vehicle to change the inter-vehicle distance and the relative speed, and therefore an action of the driver cannot be uniquely predicted. Hence determining whether the trailing operation is normal or abnormal is difficult, for which reason a determination of abnormality is inhibited.

When a sharp curve or a steep slope is present ahead of the preceding vehicle, the preceding vehicle's decelerating is highly possible. However, the driver's action of acceleration or deceleration changes depending on whether the driver can recognize the sharp curve or the steep slope present ahead, and therefore the action of the driver cannot be uniquely predicted. Hence determining whether the trailing operation is normal or abnormal is difficult, for which reason a determination of abnormality is inhibited. Whether a curve is a sharp curve is determined by checking whether the radius of curvature of the curve that is obtained from the monocular camera, the stereo camera, or the CNS 008 of the external environment sensor 003 falls within a given threshold range. Whether a slope is a steep slope is determined by checking whether a road slope obtained from the CNS 008 falls within a given threshold range.

When a stop sign being present ahead of the preceding vehicle can be determined based on stop sign information from the CNS 008, the preceding vehicle's decelerating is highly possible. However, the driver's action of deceleration changes depending on whether the driver can recognize the stop sign present ahead, and therefore the action of the driver cannot be uniquely predicted. Hence determining whether the trailing operation is normal or abnormal is difficult, for which reason a determination of abnormality is inhibited.

When a decrease in the width of the lane extending ahead of the preceding vehicle can be determined based on information from the monocular camera or the stereo camera of the external environment sensor 003 or lane width information from the CNS 008, the preceding vehicle's decelerating is highly possible. However, whether the preceding vehicle actually decelerates solely depends on whether the driver of the preceding vehicle has an intention to decelerate the vehicle. Hence determining whether the trailing operation is normal or abnormal is difficult, for which reason a determination of abnormality is inhibited. Whether the lane width is decreasing can be determined by checking an amount of change in the lane width.

When a red light being present ahead of the preceding vehicle can be determined based on an image from the monocular camera or the stereo camera of the external environment sensor 003, the preceding vehicle's decelerating is highly possible. However, the driver's action of deceleration changes depending on whether the driver can recognize the color of the traffic signal present ahead, and therefore action of the driver cannot be uniquely predicted. Hence determining whether the trailing operation is normal or abnormal is difficult, for which reason a determination of abnormality is inhibited.

As shown in FIG. 4, when a pedestrian 405 being walking in the host vehicle lane can be determined based on information from the monocular camera or the stereo camera of the external environment sensor 003, it is possible that the driver decelerates the host vehicle, regardless of the movement of the preceding vehicle 406. There is thus a possibility that the driver changes his or her trailing operation policy to give first priority to avoiding collision with the pedestrian 405. Hence determining whether the trailing operation is normal or abnormal is difficult, for which reason a determination of abnormality is inhibited.

As shown in FIG. 3, when a nearby vehicle 403 being about to cut in ahead of the host vehicle can be determined based on information from the monocular camera or the stereo camera of the external environment sensor 003, the driver may decelerate to allow the nearby vehicle 403 to cut in or may accelerate to keep the nearby vehicle 403 from cutting in, regardless of the movement of the preceding vehicle 402. In this case, the action of the driver cannot be uniquely predicted, and therefore determining whether the trailing operation is normal or abnormal is difficult, for which reason a determination of abnormality is inhibited. Whether the nearby vehicle 403 is about to cut in can be determined by checking whether the nearby vehicle 403 is approaching the host vehicle at a relative lateral speed equal to or higher than a given threshold. It can be determined also by checking whether the relative lateral position of the nearby vehicle 403 is within a given threshold range after the passage of a given time.

When the occurrence of the host vehicle's sharp acceleration or deceleration can be determined based on acceleration/deceleration information from the acceleration sensor of the host vehicle sensor 002, it is highly possible that an event to which the driver needs to give priority over the operation of trailing the preceding vehicle has occurred. This makes determining whether the trailing operation is normal or abnormal difficult, for which reason a determination of abnormality is inhibited. Whether the host vehicle has accelerated or decelerated sharply can be determined by checking whether the acceleration or deceleration is within a given threshold range.

When the driver's having operated the blinker can be determined from the blinker of the host vehicle sensor 002, it is expected that the driver will stop trailing the preceding vehicle and steer the host vehicle to a different lane. Once the host vehicle moves into the different lane, no object is present ahead of the host vehicle any more. In this case, therefore, a determination of abnormality is inhibited.

Figure 5:
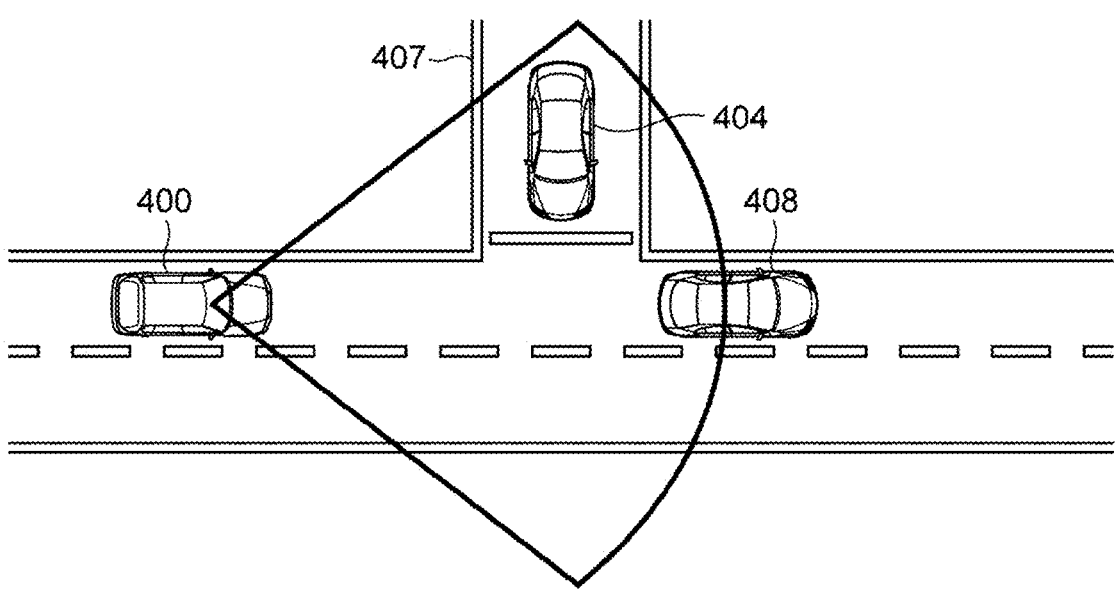
FIG. 5 is a trailing operation abnormality determination inhibition scene 3 of the traveling support system according to the one embodiment of the present invention.

When an incoming vehicle 404 is present on a road 407 in a situation where the road 407 joins the driving lane of the host vehicle, as shown in FIG. 5, it is possible that the driver, who thinks that the incoming vehicle 404 may come into the driving lane of the host vehicle, decelerates the host vehicle, regardless of the movement of a preceding vehicle 408. As a result, the inter-vehicle distance and the relative speed to the preceding vehicle 408 change temporarily, which raises the risk of making an erroneous determination that the trailing operation is abnormal. To prevent such an erroneous determination that the trailing operation is abnormal, therefore, a determination of abnormality is inhibited. Based on the fact that the relative lateral position of the incoming vehicle 404 is within a given threshold range, a road-joining situation can be determined. In addition, whether a road joining the driving lane is present ahead of the host vehicle, which is determined based on information from the CNS 008, may be added to conditions for determining the road-joining situation.

When the reliability of recognition of the preceding vehicle is dropped, it is highly possible that the accuracy of the inter-vehicle distance and the relative speed to the preceding vehicle, the inter-vehicle distance and relative speed being obtained from the external environment sensor 003, is dropped, and therefore a determination of abnormality is inhibited. The reliability of recognition of the preceding vehicle can be determined based on the fact that a state of continuously detecting the preceding vehicle from the start of detection lasts within a given time. Alternatively, it may be determined based on information on the reliability of recognition, the information being obtained from the external environment sensor 003. It may also be determined based on the fact that compared with a past inter-vehicle distance value or relative speed value, a current inter-vehicle distance value or relative speed value shows a sharp change that exceeds a given threshold range.

In this manner, the trailing operation abnormality determination inhibition unit 015 predicts the transient state in which whether the fluctuation in the current trailing operation is normal or abnormal cannot be determined, and inhibits a determination of abnormality made by the trailing operation abnormality determining unit 017. The transient state includes one of more of the following states: a state in which the preceding vehicle's sharp acceleration or deceleration has occurred; a state in which the blinkers of the preceding vehicle are actuated; a state in which a sharp curve is present ahead of the preceding vehicle; a state in which a steep slope is present ahead of the preceding vehicle; a state in which a stop sign is present ahead of the preceding vehicle; a state in which a red light is present ahead of the preceding vehicle; a state in which the width of a lane extending ahead of the preceding vehicle is decreasing; a state in which a pedestrian is walking in the host vehicle lane; a state in which a nearby vehicle's cutting in ahead of the host vehicle can be predicted; a state in which the host vehicle's sharp acceleration or deceleration has occurred;

a state in which the driver of the host vehicle has operated the blinker; a state in which an object expected to come into the driving lane of the host vehicle is present; and a state in which the reliability of recognition of the preceding vehicle is dropped.

(Trailing Operation Normality Learning Unit 016)

The trailing operation normality learning unit 016 learns a normal range of the trailing operation for the case where the driver of the host vehicle drives the host vehicle to trail the preceding vehicle. Based on the learned normal range of the trailing operation, when finding the current trailing operation being within the normal range, the trailing operation normally learning unit 016 determines that the current trailing operation is normal. In other words, the trailing operation normality learning unit 016 learns whether a tendency of fluctuation in the trailing operation of the driver with respect to the preceding vehicle is included in the normal range. The normal range refers to a state of the trailing operation in which the driver of the host vehicle trails the preceding vehicle while paying attention to the driver's driving performance.

It is assumed in this embodiment that a parameter of the normal range of the trailing operation is used in such a way that a given threshold learned theoretically in advance is stored in a nonvolatile memory of the traveling support system 010, as a parameter, which is read and used at the start of the traveling support system 010. Then, the current trailing operation of the host vehicle is calculated from a change in the state of the host vehicle or a change in the state between the host vehicle and the preceding vehicle, and is compared with the learned parameter of the normal range to determine whether the trailing operation is normal.

To calculate the current trailing operation, for example, a method of obtaining a frequency, an amplitude, and a bandwidth, which represent a tendency of a change in the relative speed, is taken. This method for calculating the current trailing operation is carried out in the following manner.

First, because the relative speed obtained from the external environment sensor 003 contains noise, only the low-frequency component of the relative speed is allowed to pass through a filter, such as a moving average filter, in filtering as pre-processing, to eliminate the noise. This filtering method may be replaced with a different filtering method (band pass filter, bypass filter, etc.) in accordance with specifications of input information from the external environment sensor 003 or the like. In a case where, different from a case of the host vehicle's traveling at high speed, the host vehicle travels at a low speed, the host vehicle's starting or changing its traveling route is easy, and therefore the possibility of occurrence of the host vehicle's sharp acceleration or deceleration is considered to be high. For this reason, when the acceleration or deceleration that is assumed according to the speed of the host vehicle is equal to or larger than a given threshold, this acceleration or deceleration may be treated as a temporary outlier event in execution of the trailing operation and may be subjected to filtering that filters out a change in the relative speed at the time of occurrence of the acceleration or deceleration. In addition, not only the filtering that filters out a change in the relative speed at the time of occurrence of the acceleration or deceleration of the host vehicle but also filtering that filters out a change in the relative speed caused by a temporary outlier event in execution of the trailing operation in accordance with the speed and acceleration/deceleration of the preceding vehicle may be carried out.

Next, when the frequency, the amplitude, and the bandwidth that represent the tendency of the change in the relative speed are obtained, a range of target data needs to be specified. In this embodiment, time-series data that are relative speed values extracted between a (past) point given time before the present point and the present point are obtained. It should be noted that an ordinary road includes more disturbance factors that hinder the trailing operation of the host vehicle than an express way does, and therefore, on the ordinary road, a time for continuing the trailing operation may vary depending on a speed range of the host vehicle. Disturbance factors refer to factors that render the host vehicle temporary incapable of continuing the trailing operation, such as a vehicle that moves into the host vehicle lane to cut in and a pedestrian who crosses the host lane. For example, the host vehicle is found running at low speed on an ordinary road in many cases, where many disturbance factors that hinder the trailing operation of the host vehicle are present and consequently the time for continuing the trailing operation gets shorter than the same in the case of the host vehicle's running on an express way. Making use of this feature, the above-mentioned given time may be changed according to the speed of the host vehicle. Alternatively, the given time may be changed depending on the type of a road on which the host vehicle is traveling, using information on whether the host vehicle is traveling on an ordinary road or an expressway, the information being obtained from CNS 008. In addition, it is preferable that the given time be set as a relatively long time of several 10 seconds to several minutes so that the trailing operation can be captured within the given time.

Figure 7:
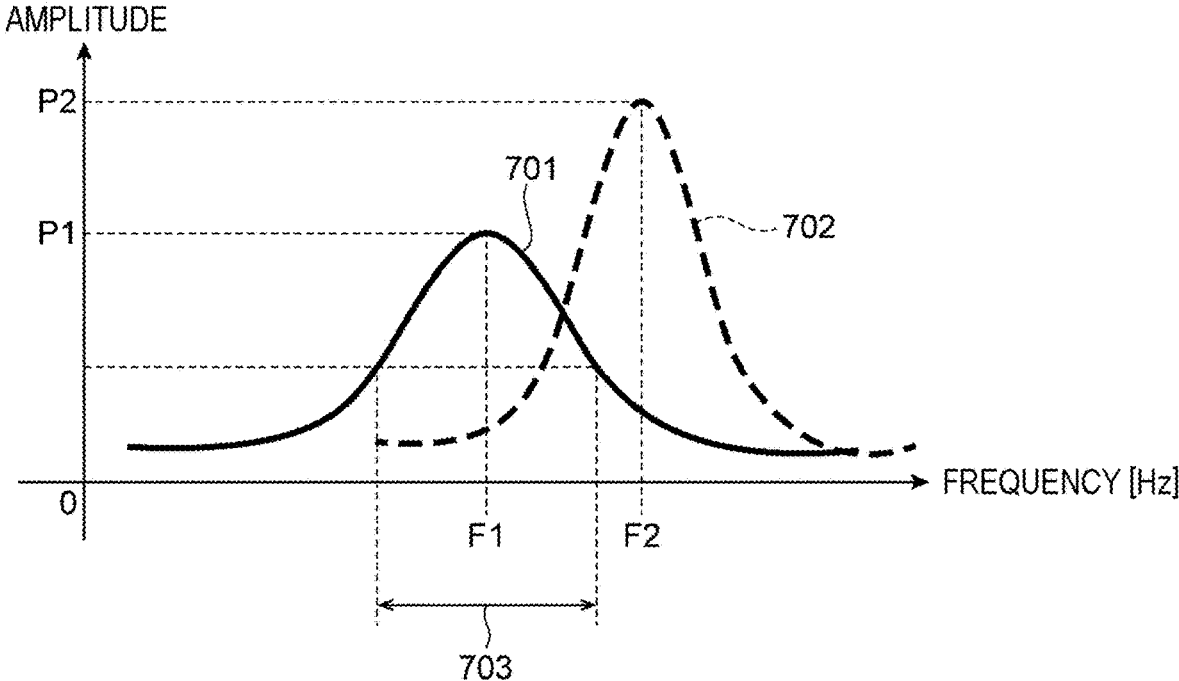
FIG. 7 is an example of an amplitude spectrum of the traveling support system according to the one embodiment of the present invention.

Then, obtained time-series data on the relative speed is subjected to a fast Fourier transform (FFT) or the like to express the data in terms of the frequency domain, from which an amplitude spectrum is calculated. For example, an amplitude spectrum 701 as shown in FIG. 7 is assumed. The amplitude spectrum 701 has a frequency F1 with a peak corresponding to an amplitude P1, thus having a bandwidth 703. When the amplitude P1 is within a given threshold range, it is considered that the amplitude is within a normal range. When the frequency F1 is within a given threshold range, it is considered that the frequency is within a normal range. When the bandwidth 703 is within a given threshold range, it is considered that the bandwidth is within a normal range. When all of these conditions hold, it is considered that the driver's trailing operation is within a normal range. However, the peak value is not always found at the frequency F1 only, as shown in FIG. 7, and may be found at other frequencies depending on time-series data to be processes. When a plurality of different frequencies with amplitudes of the same level appear in the frequency spectrum, therefore, a determination of abnormality of the trailing operation may be inhibited.

Finally, if the trailing operation's remaining within the normal range lasts for the given time, it is considered that the trailing operation is normal.

In this case, the relative speed is taken to be an example of a change in the relative relationship between the preceding vehicle and the host vehicle. However, the above fast Fourier transform operation may be carried out by using the inter-vehicle distance or THW (Time Headway) given by dividing the inter-vehicle distance by the speed of the host vehicle.

Specifically, the trailing operation normality learning unit 016 carries out frequency-wise conversion of a change in the relative relationship between the preceding vehicle and the host vehicle (relative speed, inter-vehicle distance, THW, etc.) to calculate one or more of a frequency, an amplitude, and a bandwidth, and when the calculated one or more of the frequency, the amplitude, and the bandwidth is within the given threshold range, learns that the trailing operation is normal (i.e., included in the normal range).

It is a generally known fact that an average THW is about 2 seconds when the driver trails the preceding vehicle. Based on this fact, a method different from the frequency-wise conversion method may be adopted, according to which 2 seconds±a given threshold range is defined as a normal range and when the average THW is within the given threshold range, it is determined that trailing operation is normal. The given threshold range of this method is determined by extracting some data indicating the trailing operation within the normal being range out of theoretically calculated time-series data and applying a standard deviation obtained by THW calculation/analysis. In a situation where the road is not congested, the average THW is about 2 seconds. When the road is congested, however, the average THW is expected to become shorter than 2 seconds. This is because that on the congested road, a situation where a nearby vehicle cuts in ahead of the host vehicle may arise and that the driver may intend to reduce the inter-vehicle distance to keep the nearby vehicle from cutting in on the host vehicle lane. When the road is congested, therefore, the average THW parameter may be set to a value shorter than 2 seconds, e.g., about 1.5 seconds. Because such average THW values vary depending on individual traits, 2 seconds and 1.5 seconds should be interpreted as examples.

The average of changes in the relative relationship between the preceding vehicle and the host vehicle may be calculated as the relative speed or the inter-vehicle distance.

In other words, the trailing operation normality learning unit 016 may learn that the trailing operation is normal (i.e., included in the normal range) when the average of changes in the relative relationship between the preceding vehicle and the host vehicle (relative speed, inter-vehicle distance, THW, etc.) is within the given threshold range.

In addition, given threshold parameters indicating the normal range of the trailing operation are not limited to those acquired by the driver of the host vehicle. Parameters learned by drivers across the country may be acquired from a cloud system via the Internet and be stored in the non-volatile memory in the traveling support system 010 of the host vehicle. In other words, the trailing operation normality learning unit 016 may acquire a learned parameter indicating the normal range (for each driver) from the cloud system via the Internet. Not a single learned parameter but a plurality of learned parameters are acquired from the cloud system, and a parameter fit for conditions of the driver is selected from the plurality of parameters. For example, whether a parameter is fit for the conditions of the driver is determined based on information indicating a score of the driver's driving actions, such as the driver's age and driving history, the number of accidents, and having or not having a propensity for frequent acceleration or deceleration. In addition, the driver may be allowed to select a learned parameter fir for the driver, using a touch panel or an operation button of the image display device 005.

(Trailing Operation Abnormality Determining Unit 017)

Based on the normal range and a determination of normality by the trailing operation normality learning unit 016, the trailing operation abnormality determining unit 017 determines whether the current trailing operation, by which the driver of the host vehicle is trailing the preceding vehicle, is abnormal. The trailing operation abnormality determining unit 017 determines that the driver's current trailing operation is abnormal when a state where the trailing operation normality learning unit 016 makes a determination of normality changes to a state where the trailing operation has deviated from the normal range. The state where the trailing operation has deviated from the normal range refers to a state where the fluctuation in the current trailing operation has a different of a given size of more with the normal range. Thus, when the fluctuation in the current trailing operation has the different of the given size of more with the normal range, the trailing operation abnormality determining unit 017 determines that the current trailing operation is abnormal.

Whether the trailing operation is in the state of deviation from the normal range is determined in the following manner.

When an amplitude P2 of an amplitude spectrum 702 shown in FIG. 7 is larger than a given threshold, it is considered that the amplitude has deviated from a normal range. When a frequency F2 is out of a given threshold range, it is considered that the frequency has deviated from a normal range. When a bandwidth is larger than a given threshold, it is considered that the bandwidth has deviated from a normal range. When any one of these conditions holds, it is considered that the driver's trailing operation has deviated from the normal range. Further, when a state of the trailing operation's deviating from the normal range continues for a given time, it is confirmed that the trailing operation is abnormal. In other words, when a state where the fluctuation in the current trailing operation has the different of the given size of more with the normal range continues for a given time, it is confirmed that the trailing operation is abnormal. The above-mentioned normal ranges may be given hysteretic property to prevent frequent repetition of normality and abnormality determinations. In such a case, the given thresholds may each be provided with a margin.

When the host vehicle keeps trailing the preceding vehicle at the same speed for a long time, the trailing operation tends to get into an abnormal state because of the driver's fatigue or the like. For this reason, an extra condition for determining abnormality of the trailing operation may be added, according to which when a state in which a speed change from the speed of the host vehicle at a point of time of confirmation of the trailing operation being normal is within a given range continues for a given time, the abnormality of the trailing operation is determined.

(Alarm Control Unit 018)

When the trailing operation abnormality determining unit 017 confirms the abnormality of current trailing operation, the alarm control unit 018 requests (instructs) the audio output device 004 to emit an alarm sound. The alarm sound may be a beep sound or may be voice guidance for notifying the driver of a drop in the drive's performance in driving. In addition, the alarm control unit 018 requests (instructs) the image display device 005 to display an alarm.

To prevent issue of a false alarm, the alarm control unit 018 may be configured such that it make a request for an alarm sound or alarm display when the abnormality of the trailing operation is confirmed and then a state of confirmation of the abnormality of the trailing operation continues for a given time.

When the alarm sound is emitted or the alarm display is outputted but the driver is actually not in a state of a drop in the driver's performance in driving, the driver operates the image display device 005 to correct an error the trailing operation abnormality determining unit 017 has made. For example, one conceivable method for error correction is to put an operation button, with which the driver is able to select either the alarm being correct or the alarm being incorrect, on the displayed alarm and allow the driver to determine whether the alarm is correct or incorrect by operating the button.

When the alarm being incorrect is selected, it means the alarm is false, in which case, therefore, the trailing operation normality learning unit 016 changes the learned normal range of the trailing operation to an unlearned normal range. After changing the learned normal range to the unlearned normal range, the driver may operate the image display device 005 again to select another parameter different from a parameter used at the issue of the false alarm, from a plurality of parameters representing the normal range that the trailing operation normality learning unit 016 provides. Another parameter is, for example, a parameter by which a tendency of fluctuation in the driver's trailing operation can be specified from among large, medium, and small fluctuations in the trailing operation. When the driver resets the parameter, the unlearned normal range is corrected to the learned normal range at the trailing operation normality learning unit 016, which renders the trailing operation abnormality determining unit 017 capable of making a determination of abnormality again. In this manner, the trailing operation normality learning unit 016 corrects the learned normal range, based on a response from the driver.

After the alarm is started, the alarm control unit 018 cancels the alarm when a given time has elapsed after a condition for starting the alarm becomes invalid. Alternatively, the alarm is canceled when the driver's intention to drive can be confirmed after the condition for starting the alarm becomes invalid. Once the alarm is started (in other words, in a state where the alarm control unit 018 gives an instruction to issue the alarm), there is a possibility that the driver is still in a state of a drop in the driver's performance in driving, and therefore an approach to prevent erroneous cancellation of the alarm needs to be devised. For example, the alarm is canceled when after the abnormality of the trailing operation is confirmed and the alarm is started, a state of the trailing operation being no longer abnormal, which is determined by the trailing operation abnormality determining unit 017, lasts for a given time (in other words, when a given time has elapsed from a point of time at which abnormality determined by the trailing operation abnormality determining unit 017 is eliminated). Likewise, when the preceding vehicle disappears as an alarm request being made, the alarm is canceled at a point of time at which a given time has elapsed after the disappearing of the preceding vehicle. Likewise, the alarm is canceled when after the start of the alarm, a given time has elapsed from the start of inhibition of a determination of abnormality by the trailing operation abnormality determination inhibition unit 015. Likewise, the alarm is canceled when following the start of the alarm, a given time has elapsed after the trailing operation normality learning unit 016 resets its parameter learning. Likewise, the alarm is canceled when after the start of the alarm, in a state where the trailing operation abnormality determining unit 017 determines that the trailing operation is normal (in other words, in a state where abnormality determined by the trailing operation abnormality determining unit 017 is eliminated), a given time has elapsed after the driver operates the accelerator, the brake, the blinker, or the steering wheel. Cancellation conditions may be applied to speed control by the speed control unit 019, which follows the cancellation.

In this manner, in a state where the alarm control unit 018 has given an instruction to issue an alarm, the alarm control unit 018 cancels the alarm when a given time has elapsed from: a point of time at which abnormality determined by the trailing operation abnormality determining unit 017 is eliminated; or a point of time at which the trailing operation abnormality determination inhibition unit 015 starts inhibition of a determination of abnormality; or a point of time at which the trailing operation normality learning unit 016 resets its parameter learning; or a point of time at which, in a state of an abnormality determined by the trailing operation abnormality determining unit 017 having been eliminated, the driver starts operating the accelerator, the brake, the blinker, or the steering wheel.

(Speed Control Unit 019)

When the driver does not correct his or her driving action after the alarm control unit 018 issues an alarm, the speed control unit 019 requests the acceleration device 006 to suppress acceleration. When an acceleration suppression request has been made, the host vehicle 001 does not accelerate even if the driver steps on the accelerator pedal. As a result, when the driver who is in a state of a drop in the driver's performance in driving erroneously steps on the accelerator pedal, the possibility of collision with the preceding vehicle can be reduced.

In another case, the speed control unit 019 requests the deceleration device 007 to decelerate. When a deceleration request has been made, the host vehicle 001 automatically starts decelerating. As a result, when the driver who is in a state of a drop in the driver's performance delays in operating the brake, the possibility of collision with the preceding vehicle can be reduced. The requested deceleration is calculated based on a constant acceleration linear motion model so that the THW does not become equal to or smaller than a given value.

Whether the driver is not correcting the driving action is determined by checking whether a given time has elapsed from output of the alarm. Alternatively, it is determined by checking whether the risk of collision with the preceding vehicle becomes equal to or larger than a given threshold. A TTC (Time to Collision) or THW is used as an index for the risk of collision.

[Description of Flowchart]

FIG. 2 is a flowchart showing an example of a traveling support routine executed by the traveling support system 010. This flowchart is repeatedly executed at a given cycle by the CPU included in the ECU serving as the traveling support system 010.

At the start of the traveling support routine, the preceding vehicle recognizing unit 014 determines, at step 300, whether a preceding vehicle is present. When it is determined that no preceding vehicle is present, a determination of abnormality of the trailing operation is not made, and the process flow proceeds to step 316. When an abnormal event has developed at the host vehicle 001, the process flow proceed to step 316 in the same manner. When it is determined that the preceding vehicle is present, the trailing operation abnormality determination inhibition unit 015 determines, at step 302, whether a condition for inhibiting a determination of abnormality of the trailing operation holds.

When it is determined that the determination of abnormality of the trailing operation is inhibited, the process flow proceeds to step 316 as the determination of abnormality of the trailing operation is skipped.

When it is determined that the determination of abnormality of the trailing operation is not inhibited, the trailing operation normality learning unit 016 determines, at step 305, whether the normal range has been learned already. When the normal range has not been learned yet, the normal range of the trailing operation is learned at step 312.

Then, at step 313, normal range learning results are recorded so that even when the power supply of the traveling support system 010 is turned off, the learned normal range can be used when the power supply is turned on next time. The learning results are stored in the nonvolatile memory of the traveling support system 010. The stored learning results are read from the nonvolatile memory when the host vehicle is started next time, that is, when the power supply of the traveling support system 010 is turned on.

The learning results may be stored in a cloud server through the Internet. The stored learning results are read from the cloud server when the host vehicle is started next time, that is, when the power supply of the traveling support system 010 is turned on, and are stored in the nonvolatile memory in the traveling support system 010.

Specifically, the trailing operation normality learning unit 016 stores the normal range learned for each driver (in the non-volatile memory or the cloud server), and reads the corresponding stored normal range for the driver (from the non-volatile memory or the cloud server) when the host vehicle is started next time, that is, when the power supply of the traveling support system 010 is turned on.

Following the learning results recording at step 313, the process flow proceeds to step 316.

When the normal range has been learned, the trailing operation normality learning unit 016 evaluates, at step 306, the current trailing operation. A trailing operation calculated by subjecting the current trailing operation to the fast Fourier transform (FFT) or the like is compared with the learned normal range to determine whether the current trailing operation is normal (i.e., is included in the normal range).

Subsequently, at step 307, the trailing operation abnormality determining unit 017 determines whether the previous trailing operation is normal. When the previous trailing operation is not normal, the process flow proceeds to step 316. When the previous trailing operation is normal, the current trailing operation is compared with the learned normal range at step 308 to determine whether fluctuation in the current trailing operation has a difference of a given size or more with the learned normal range. When the fluctuation in the current trailing operation does not have the difference of the given size or more, the process flow proceeds to step 316. When the fluctuation in the current trailing operation has the difference of the given size or more, it is determined that the current trailing operation is abnormal, and the process flow proceeds to step 309.

At step 309, the alarm control unit 018 gives an alarm instruction to issue an alarm. At step 316, the alarm control unit 018 determines whether an alarm cancellation condition holds. When the alarm cancellation condition does not hold, nothing is done, and the routine is ended. When the alarm cancellation condition holds, the alarm is canceled at step 317. Then, the routine is ended.

After the routine is ended, the CPU executes the next cycle of the routine by starting from step 300.
[Description of Effects]

As described above, the possibility of collision can be reduced by detecting the abnormality of the driver's trailing operation and issuing the alarm or carrying out acceleration suppression or deceleration.

Second Embodiment: Examples of Learning

A configuration of a traveling support system of a second embodiment of the present invention is the same as that of the traveling support system of first embodiment, and a case where a component shown in the configuration diagram of FIG. 1 executes a different process will hereinafter be described.
[Description of Configuration]

The host vehicle sensor 002 includes, for example, a driver monitor which is a camera that photographs the vehicle interior, in addition to the sensors described in the first embodiment. The driver monitor, for example, monitors the driver's eye line, the direction or expression of the driver's face, and the like to detect the driver's being in a state of a drop in the driver's performance in driving and outputs the detected driver's state to the traveling support system 010. The state of a drop in the driver's performance in driving refers to the driver's being in a state of driving without concentration or in a sleepy condition.

The traveling support system 010 includes, for example, a nonvolatile memory storing train data, in addition to the devices described in the first embodiment. The train data refers to learning data representing a correct answer for use in supervised learning in machine learning.

When supplied with power, i.e., turned on, the traveling support system 010 constantly collects time-series data including the part of trailing operation that is within the normal range, the time-series data being acquired during normal driving from the host vehicle sensor 002 and the external environment sensor 003, and stores a plurality of pieces of time-series data in the memory, as train data. At the time of collection of the time-series data, a narrowing-down condition is set in advance, which allows a reduction in the volume of the memory used.

One example of the narrowing-down condition is, for example, a condition that the risk of collision between the host vehicle and the preceding vehicle is equal to or smaller than a given threshold (situation considered to be not dangerous). The risk of collision is calculated by the same method as mentioned in the description of the speed control unit 019 in the first embodiment. For example, when the TTC is longer than a given time, the possibility of the trailing operation's being within the normal range is high.

In addition, the driver's performing none of sharp acceleration or deceleration, quick steering, blinker operation, and shift operation may be included in the condition.

In addition, the following method may also be included in the condition.

First, after a given time has elapsed from a point of time at which the above narrowing-down condition comes to hold during driving by the driver (after time series data is accumulated in a period of about several seconds to several minutes), the audio output device 004 or the image display device 005 outputs a voice message or a display message for checking with the driver whether the current driving being the trailing operation within the normal range is correct. The driver hears or visually recognizes the voice message or the display message, and when the current driving being the trailing operation within the normal range is correct, presses a correct answer button on the image display device 005, thus informing the traveling support system 010 of the fact that current driving being the trailing operation within the normal range is correct. The press to the correct answer button is interpreted as the driver's permission to using the time series data as the train data. The traveling support system 010 thus stores the time series data in the memory, as the train data. In this manner, the fact that the correctness of the current traveling of the host vehicle being the driver's normal trailing operation of trailing the preceding vehicle is confirmed by the driver may be included in the condition.

In addition, when the narrowing-down condition holds and the driver's not in the state of a drop in the driver's performance in driving (in other words, the driver's performance in driving, which is dropping, is equal to or higher than a given value) is confirmed by the driver monitor of the host vehicle sensor 002, the traveling support system 010 stores the time series data in the memory, as the train data.

Further, the narrowing-down condition may be acquired from the cloud system, and the traveling support system 010 may store time series data satisfying the acquired narrowing-down condition in the memory, as the train data.

The train data may be uploaded to the cloud system.

The following method may be included in the narrowing-down condition.

First, when the driver starts driving, time series data is collected and is uploaded to the cloud system. Subsequently, after finishing driving, the driver himself or herself accesses the cloud system from an external terminal, such as a smartphone or a personal computer, and specifies time-series data indicating the driver's not in the state of a drop in the driver's performance in driving on the external terminal, thereby selecting train data. The traveling support system 010 acquires the selected train data from the cloud system at a point of time at which the power supply of the traveling support system 010 is turned on next time, and stores the acquired train data in the memory.

Another method may also be adopted, according to which on the external terminal, the driver selects, before starting driving, a time zone, a specific place, or an upload condition for uploading time-series data in advance to the cloud system. The upload condition is assumed to be the condition that the risk of collision between the host vehicle and the preceding vehicle is equal to or smaller than the given threshold (situation considered to be not dangerous), or the condition that the driver performs none of sharp acceleration or deceleration, quick steering, blinker operation, and shift operation.

(Trailing Operation Normality Learning Unit 016)

The trailing operation normality learning unit 016 uses a plurality of pieces of train data stored in the memory, as correct answers, and learns the normal range of the trailing operation from input time-series data acquired from the host vehicle sensor 002 and the external environment sensor 003, using a learning method like deep learning.

Specifically, the trailing operation normality learning unit 016 uses at least one of the following features: a feature in the case of the risk of collision between the host vehicle and the preceding vehicle being equal to or smaller than the given threshold (situation considered to be not dangerous), a feature in the case of the driver's performing none of sharp acceleration or deceleration, quick steering, blinker operation, and shift operation, and a feature in the case where the fact that the correctness of the current traveling of the host vehicle being the driver's normal trailing operation of trailing the preceding vehicle is confirmed by the driver, as train data (learning data serving as correct answers), and learns the normal range of the trailing operation.

In addition, from the plurality of train data stored in the memory, the trailing operation normality learning unit 016 calculates the frequency, amplitude, and bandwidth of the relative speed by a method using fast Fourier transform (FFT) or the like for calculating the fluctuation in the trailing operation, the method being executed by the trailing operation normality learning unit 016 as described in the first embodiment. These calculated numerical values are read as train data, and the normal range of the frequency, the amplitude, and the bandwidth of the relative speed, that is, a given range of any one or more of the frequency, the amplitude, and the bandwidth of the relative speed is learned by using the learning method like fast Fourier transform (FFT).

In addition, the trailing operation normality learning unit 016 may calculate an average of the THW, the relative speed, the inter-vehicle distance, and the like from the plurality of train data stored in the memory, read this numerical values, i.e., average as train data, and may learn a normal range of the average of the THW, the relative speed, the inter-vehicle distance, and the like, that is, a given threshold of the average of the THW, the relative speed, the inter-vehicle distance, and the like.

In other words, the trailing operation normality learning unit 016 uses at least one of the following features: the feature in the case of the risk of collision between the host vehicle and the preceding vehicle being equal to or smaller than the given threshold (situation considered to be not dangerous), the feature in the case of the driver's performing none of sharp acceleration or deceleration, quick steering, blinker operation, and shift operation, and the feature in the case where the fact that the correctness of the current traveling of the host vehicle being the driver's normal trailing operation of trailing the preceding vehicle is confirmed by the driver, as train data (learning data serving as correct answers), and learns the given threshold of any one or more of the frequency, the amplitude, and the bandwidth or the given threshold of the average of changes in the relative relationship between preceding vehicle and the host vehicle (the relative speed, the inter-vehicle distance, the THW, etc.).

The trailing operation normality learning unit 016 narrows down the train data under a condition confirmed by the driver monitor that the driver's performance in driving, which is dropping, is equal to or higher than the given value (the driver is not in the state of a drop in the driver's performance in driving), and learns the normal range of the trailing operation. Alternatively, the trailing operation normality learning unit 016 acquires a train data narrowing-down condition from the cloud system, narrows down the train data, based on the narrowing-down condition, and learns the normal range of the trailing operation. Alternatively, the trailing operation normality learning unit 016 narrows down the train data, based on any one of a time, a place, and a condition specified by the driver, and learns the normal range of the trailing operation.

Also, the trailing operation normality learning unit 016 learns the normal range of the trailing operation from the train data acquired from the cloud system.

[Description of Effects]

As described above, by efficiently preparing train data and using the train data for learning the normal range of the driver's trailing operation, a responsive action to a specific tendency or trait of the driver can be automatized or semi-automatized and therefore incidents of issuing a false alarm against the driver's state of a drop in the driver's performance in driving can be reduced.

Third Embodiment: Determining Abnormality of
Trailing Operation by Detecting Fluctuation in
Driving From Lane Marking Information A configuration of a traveling support system of a second
embodiment of the present invention is the same as that of
the traveling support system of first embodiment, and a case
where a component shown in the configuration diagram of
FIG. 1 executes a different process will hereinafter be
described.

[Description of Configuration]

(Trailing Operation Normality Learning Unit 016)

The trailing operation normality learning unit 016
includes a remain-in-lane operation normality learning unit,
and learns a normal range of fluctuation in a remain-in-lane
operation in a case where the driver keeps the host vehicle
inside the lane.

The fluctuation in the remain-in-lane operation refers to a
relative movement that the host vehicle makes to a lane
marking when the driver keeps the host vehicle inside the
lane by manual driving. The relative movement in this
embodiment refers to a change in the state of the host vehicle
that is calculated based on given data from the host vehicle
sensor 002, the given data being detected in time series, or
a change in a state between the host vehicle and the lane
marking, which is detected by the external environment
sensor 003. Specifically, changes in the state of the host
vehicle include a change in a steering angle, a change in a
yaw rate, and the like. Changes in the state between the host
vehicle and the lane marking include a change in a relative
lateral position to the lane marking.

Based on the learned normal range of the remain-in-lane
operation, the trailing operation normality learning unit 016
determines that the remain-in-lane operation is normal when
the current remain-in-lane operation is within the normal
range. The normal range refers to the remain-in-lane opera-
tion executed in a state where the driver keeps the host
vehicle inside the lane while paying attention to driving.

In this embodiment, it is assumed that a parameter of the
normal range of the remain-in-lane operation is obtained
such that a threshold learned theoretically in advance is
stored in the nonvolatile memory of the traveling support
system 010, as a parameter, and that the parameter is read
and used when the traveling support system 010 is activated.
Then, the current remain-in-lane operation of the host
vehicle is calculated from the change in the state of the host
vehicle and the change in the state between the host vehicle
and the lane marking, and is compared with the learned
parameter of the normal range to determine whether the
remain-in-lane operation is normal.

To calculate the current remain-in-lane operation, for
example, a method of obtaining a frequency, an amplitude,
and a bandwidth that represent a tendency of a change in the
relative lateral position to the lane marking is adopted. A
method of calculating the remain-in-lane operation involves
fast Fourier transform (FFT) or the like as the method of
calculating the trailing operation of the first embodiment
does, and therefore will not described in detail. As in the
case of the method of calculating the trailing operation of the
first embodiment, whether the remain-in-lane operation is
normal may be determined by using the average of changes
in the relative lateral position to the lane marking.

Specifically, (the remain-in-lane operation normality
learning unit of) the trailing operation normality learning
unit 016 carries out frequency-wise conversion of a change
in the relative relationship between the host vehicle and the
lane marking (such as a change in the relative lateral position to the lane marking), thereby calculating any one or more of
a frequency, an amplitude, and a bandwidth, and learns that
the remain-in-lane operation is normal (i.e., is included in
the normal range) when any one or more of the calculated
frequency, amplitude, and bandwidth is within a given
threshold range or when an average of changes in the
relative relationship between the host vehicle and the lane
marking (such as changes in the relative lateral position to
the lane marking) is within a given threshold range.

When supplied with power, i.e., turned on, the traveling
support system 010 constantly collects time-series data
including the part of remain-in-lane operation that is within
the normal range, the time-series data being acquired during
normal driving from the host vehicle sensor 002 and the
external environment sensor 003, and stores a plurality of
pieces of time-series data in the memory, as train data. At the
time of collection of the time-series data, a narrowing-down
condition is set in advance, which allows a reduction in the
volume of the memory used.

One example of the narrowing-down condition is, for
example, a condition that the possibility of the host vehicle's
crossing the lane marking is equal to or smaller than a given
threshold (situation considered to be not dangerous). The
possibility of crossing the lane marking is obtained by
calculating, for example, a time to line crossing (TTCL), that
is, a time the host vehicle takes to cross the lane marking. If
this TTCL is larger than a given time, it is highly possible
that the trailing operation remains in the normal range. The
TTLC can be calculated by dividing the host vehicle's
lateral speed by the relative lateral position to the lane
marking.

Other narrowing-down conditions are the same as those
for the trailing operation of the second embodiment, and
therefore will not be described in details.

In the same manner as the trailing operation normality
learning unit 016 does, the remain-in-lane operation nor-
mality learning unit uses a plurality of pieces of train data
stored in the memory, as correct answers, and learns the
normal range of the trailing operation from input time-series
data acquired from the host vehicle sensor 002 and the
external environment sensor 003, using a learning method
like deep learning.

Specifically, (the remain-in-lane operation normality
learning unit of) the trailing operation normality learning
unit 016 extracts a feature that makes the possibility of
crossing the lane marking equal to or smaller than a given
value (situation not considered to be dangerous), from
changes in the relative relationship between the host vehicle
and the lane marking (such as changes in the relative lateral
position to the lane marking), as train data (learning data
serving as correct answers), and learns the normal range of
the trailing operation.

[Description of Effects]

As described above, a state of a drop in the driver's
performance in driving can be detected, regardless of the
presence or absence of the preceding vehicle. This allows
application of the traveling support system to a wider range.

Summary of First Embodiment to Third
Embodiment

As described above, the traveling support system 010
according to this embodiment includes: the preceding
vehicle recognizing unit 014 that detects a preceding vehicle
traveling ahead of a host vehicle; the trailing operation
normality learning unit 016 that learns whether a tendency
of fluctuation in a trailing operation by a driver of the host vehicle of trailing the preceding vehicle is included in a normal range, from at least one feature of a change in a state of the host vehicle and a change in a state between the host vehicle and the preceding vehicle, the one feature being calculated based on given data detected in time series; a trailing operation abnormality determining unit 017 that when fluctuation in a current trailing operation has a difference of a given size or more with the normal range, determines that the current trailing operation is abnormal; a trailing operation abnormality determination inhibition unit 015 that predicts a transient state in which whether the fluctuation in the current trailing operation is normal or abnormal cannot be determined and that inhibits a determination made by the trailing operation abnormality determining unit 017, and an alarm control unit 018 that when the current trailing operation is determined to be abnormal, issues an alarm instruction.

In other words, the traveling support system 010 of this embodiment detects the tendency of the fluctuation in the trailing operation of trailing the preceding vehicle (the fluctuation different from the normal one), detects a state of a drop in the driver's performance in driving, and issues an alarm.

According to this embodiment, by detecting a sign of the driver's getting into the state of a drop in the driver's performance in driving, an alarm is issued earlier to the driver, which prevents collision with an obstacle or reduces the risk of the same.

The present invention is not limited to the above embodiments but includes various modifications. For example, the above embodiments have been described in detail to give an understandable description of the present invention, and are not necessarily limited to an embodiment including all constituent elements described above.

Some or all of the above-described constituent elements, functions, processing units, processing means, and the like may be provided in the form of hardware by, for example, packaging them into an integrated circuit. Each of the above-described constituent elements, functions, and the like may be provided in the form of software by a processor that interprets and executes a program for implementing each function. Information, such as a program, a table, and a file, for implementing each function can be stored in a storage device, such as a memory, a hard disk, and a solid state drive (SSD), or in a recording medium, such as an IC card, an SD card, and a DVD.

Control lines and information lines considered to be necessary for the description are indicated, and control lines and information lines the product needs are not necessarily indicated entirely. It is safe to consider that actually, almost all constituent elements are interconnected.

REFERENCE SIGNS LIST

001 vehicle (host vehicle)
002 host vehicle sensor
003 external environment sensor
004 audio output device
005 image display device
006 acceleration device
007 deceleration device
008 car navigation system (CNS)
010 traveling support system
013 surrounding environment recognizing unit
014 preceding vehicle recognizing unit
015 trailing operation abnormality determination inhibition unit
016 trailing operation normality learning unit
017 trailing operation abnormality determining unit
018 alarm control unit
019 speed control unit

The invention claimed is:

1. A traveling support system comprising:
a preceding vehicle recognizing unit that detects a preceding vehicle traveling ahead of a host vehicle;
a trailing operation normality learning unit that learns whether a tendency of fluctuation in a trailing operation by a driver of the host vehicle of trailing the preceding vehicle is included in a normal range, from at least one feature of a change in a state of the host vehicle and a change in a state between the host vehicle and the preceding vehicle, the one feature being calculated based on given data detected in time series;
a trailing operation abnormality determining unit that when fluctuation in a current trailing operation has a difference of a given size or more with the normal range, determines that the current trailing operation is abnormal; and
an alarm control unit that when the current trailing operation is determined to be abnormal, gives an instruction to issue an alarm.

2. The traveling support system according to claim 1, wherein
the trailing operation normality learning unit carries out frequency-wise conversion of a change in a relative relationship between the preceding vehicle and the host vehicle, thereby calculating at least one or more of a frequency, an amplitude, and a bandwidth, and when at least the one or more of the frequency, the amplitude, and the bandwidth that is calculated is within a given threshold range, learns that the trailing operation is normal.

3. The traveling support system according to claim 1, wherein
when an average of changes in a relative relationship between the preceding vehicle and the host vehicle is within a given threshold range, the trailing operation normality learning unit learns that the trailing operation is normal.

4. The traveling support system according to claim 1, wherein
the trailing operation normality learning unit selects at least one feature from these features:
a feature in a case of a risk of collision with the preceding vehicle being equal to or smaller than a given value;
a feature in a case of a driver of the host vehicle performing none of sharp acceleration or deceleration, quick steering, blinker operation, and shift operation; and
a feature in a case where a fact that correctness of current traveling of the host vehicle being normal trailing operation by a driver of the host vehicle of trailing the preceding vehicle is confirmed by the driver of the host vehicle, uses the one feature as train data, and learns the normal range.

5. The traveling support system according to claim 2, wherein
the trailing operation normality learning unit selects at least one feature from these features:
a feature in a case of a risk of collision with the preceding vehicle being equal to or smaller than a given value;

a feature in a case of a driver of the host vehicle performing none of sharp acceleration or deceleration, quick steering, blinker operation, and shift operation; and a feature in a case where a fact that correctness of current traveling of the host vehicle being normal trailing operation by a driver of the host vehicle of trailing the preceding vehicle is confirmed by the driver of the host vehicle, uses the one feature as train data, and learns the given threshold of one or more of the frequency, the amplitude, and the bandwidth.

6. The traveling support system according to claim 3, wherein the trailing operation normality learning unit selects at least one feature from these features:

a feature in a case of a risk of collision with the preceding vehicle being equal to or smaller than a given value;

a feature in a case of a driver of the host vehicle performing none of sharp acceleration or deceleration, quick steering, blinker operation, and shift operation; and a feature in a case where a fact that correctness of current traveling of the host vehicle being normal trailing operation by a driver of the host vehicle of trailing the preceding vehicle is confirmed by the driver of the host vehicle, uses the one feature as train data, and learns the given threshold of an average of changes in a relationship between the preceding vehicle and the host vehicle.

7. The travelling support system according to claim 1, wherein the trailing operation normality learning unit stores a normal range learned for each driver, and reads a corresponding stored normal range for the driver when the host vehicle is started next time.

8. The traveling support system according to claim 4, wherein the trailing operation normality learning unit narrows down the train data under a condition confirmed by a driver monitor that a diver's performance in driving being dropping, is equal to or larger than a given value, or under a train data narrowing-down condition acquired from a cloud system, or based on any one of a time, a place, and a condition specified by the driver, and learns the normal range.

9. The traveling support system according to claim 1, wherein the trailing operation normality learning unit corrects the normal range, based on a response from a driver.

10. The traveling support system according to claim 4, wherein the trailing operation normality learning unit learns the normal range from train data acquired from a cloud system.

11. The traveling support system according to claim 7, wherein the trailing operation normality learning unit acquires a learned normal range from a cloud system.

12. The traveling support system according to claim 1, wherein in addition to calculation of the feature, the trailing operation normality learning unit carries out frequency-wise conversion of a change in a relative relationship between the host vehicle and a lane marking, thereby calculating one or more of a frequency, an amplitude, and a bandwidth, and when any one or more of the frequency, the amplitude, and the bandwidth that are calculated is within a given threshold range or when an average of changes in the relative relationship between the host vehicle and the lane marking is within a given threshold range, learns that the trailing operation is normal.

13. The traveling support system according to claim 1, wherein in addition to calculation of the feature, the trailing operation normality learning unit extracts a feature that makes a possibility of crossing a lane marking equal to or smaller than a given value, from changes in a relative relationship between the host vehicle and the lane marking, as train data, and learns the normal range.

14. The traveling support system according to claim 1, further comprising a trailing operation abnormality determination inhibition unit that predicts a transient state in which whether fluctuation in a current trailing operation is normal or abnormal cannot be confirmed and that inhibits a determination made by the trailing operation abnormality determining unit.

15. The traveling support system according to claim 14, wherein the transient state includes any one or more of:

a state in which sharp acceleration or deceleration of a preceding vehicle has occurred;

a state in which a blinker of the preceding vehicle is operated;

a state in which a sharp curve is present ahead of the preceding vehicle;

a state in which a steep slope is present ahead of the preceding vehicle;

a state in which a stop sign is present ahead of the preceding vehicle;

a state in which a red light is present ahead of the preceding vehicle;

a state in which a width of a lane extending ahead of the preceding vehicle is decreasing;

a state in which a pedestrian is walking in a host vehicle lane;

a state in which a nearby vehicle is expected to cut in ahead of a host vehicle;

a state in which sharp acceleration or deceleration of the host vehicle has occurred;

a state in which a driver of the host vehicle has operated a blinker;

a state in which an object expected to come into a lane where the host vehicle is traveling is present; and a state in which reliability of recognition of the preceding vehicle is dropped.

* * * * *